Oct. 13, 1953  D. BUCCICONE  2,655,248
METAL SHEET LAPPING APPARATUS AND METHOD
Filed May 3, 1951
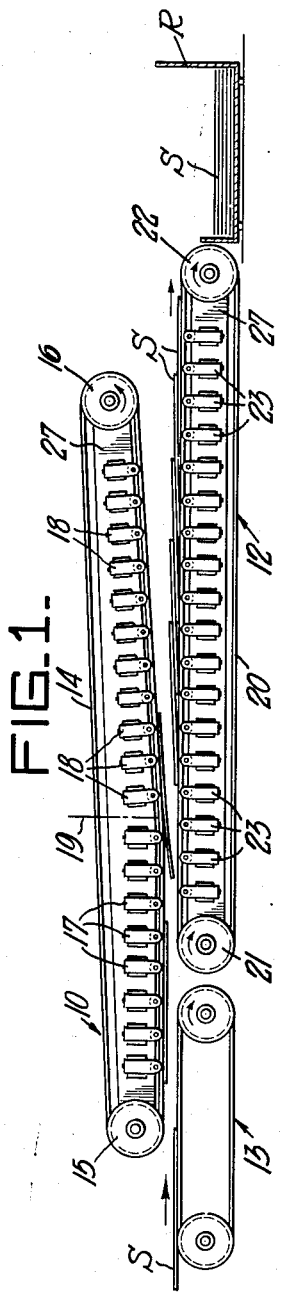
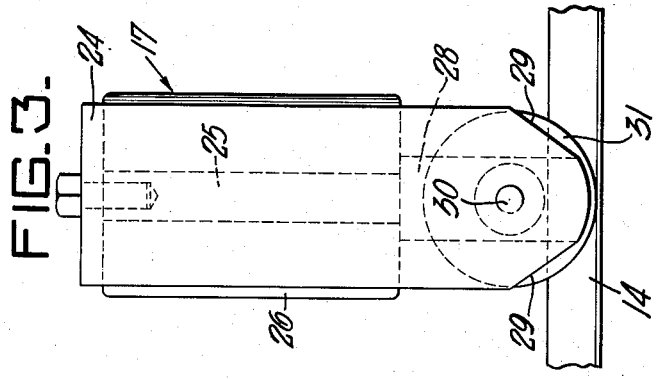
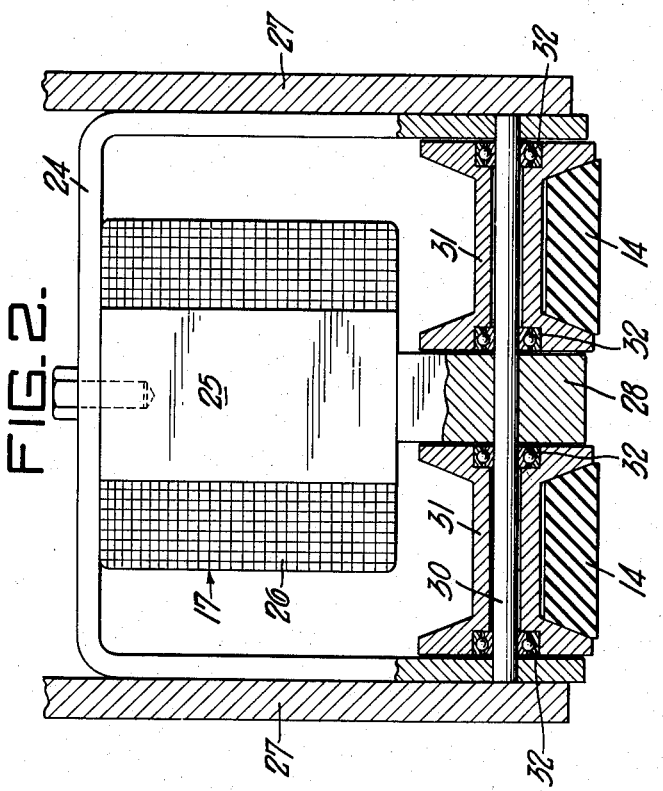
Inventor:
DARIO BUCCICONE,
by: Donald G. Dalton
his Attorney.

Patented Oct. 13, 1953

2,655,248

UNITED STATES PATENT OFFICE 2,655,248

METAL SHEET LAPPING APPARATUS AND METHOD

Dario Buccicone, Gary, Ind.

Application May 3, 1951, Serial No. 224,350

6 Claims. (Cl. 198—35)

This invention relates to apparatus and methods for lapping metal sheets, particularly for facilitating piling the sheets after they have been sheared in a high speed processing line.

An object of the invention is to provide an improved lapping apparatus and method capable of lapping sheets which are emerging from high speed processing lines without causing cobbles in the line.

A further object is to provide an improved sheet lapping apparatus which operates magnetically, but in which the magnets are energized continuously and there is no need to make and break the circuit thereto.

Another object is to provide an improved sheet lapping apparatus and method which maintains control of both ends of each sheet at all times, never allowing sheets to move about freely.

In accomplishing these and other objects of the invention, I have provided improved details of structure, a single form of which is shown in the accompanying drawing, in which:

Figure 1 is a somewhat schematic side elevational view of a lapping apparatus which embodies features of the present invention;

Figure 2 is a vertical cross sectional view of one of the magnets of the apparatus; and Figure 3 is an enlarged side elevational view of this magnet.

The lapping apparatus of the present invention comprises a top magnetic conveyor 10 and a bottom magnetic conveyor 12. The underside of conveyor 10 and the upper side of conveyor 12 are spaced apart a short distance vertically, for example 4 to 6 inches, although the exact spacing is not critical. An entry conveyor 13 introduces sheets S to the left or entry end of said top conveyor, which extends somewhat beyond the bottom conveyor at its entry end.

The top conveyor includes endless belts 14, sheaves 15 and 16, and two series of magnets 17 and 18 which have downwardly facing poles. At least one of the sheaves is power driven so that belts 14 travel at about the same speed as the entry conveyor 13. Magnets 17, which are adjacent the entry end, are all alike and are of high strength. Magnets 18 are progressively weaker. Between the last magnet 17 and the first magnet 18 the under face of the conveyor has a slight upward break, indicated at 19. The underside of the portion of conveyor 10 to the left of this break is substantially parallel to the upper side of the bottom conveyor 12, both preferably being horizontal. The underside of the portion of conveyor 10 to the right of this break diverges from the bottom conveyor, preferably sloping upwardly at a small angle. The magnets 17 support the sheets introduced to the top conveyor and belts 14 carry such sheets to the right.

The bottom magnetic conveyor 12 likewise includes endless belts 20, sheaves 21 and 22, and a series of magnets 23, which have upwardly facing poles. At least one of the sheaves 21 or 22 is power driven, but at a rate such that belts 20 travel much more slowly than belts 14. All of the magnets 23 are strong magnets, of about the same strength as magnets 17 of the top conveyor 10.

As a sheet travels along the underside of the top conveyor 10, magnets 17 hold the sheet thereon until the leading end of the sheet passes the break 19. Thereupon the leading end continues to advance along the top conveyor, being held by the weaker magnets 18, but the trailing end of the sheet automatically breaks loose and is attracted by magnets 23 to the bottom conveyor. For an instant the leading end remains held to the top conveyor and the trailing end to the bottom conveyor, but since the magnets of the latter are much stronger than the magnets 18, almost immediately the leading end breaks loose and also goes to the bottom conveyor. Since the bottom conveyor travels more slowly than the top conveyor, the sheets are lapped as they are deposited thereon. A suitable receiving means R is situated at the exit end of the bottom conveyor and the lapped sheets are piled thereon.

Figures 2 and 3 show the details of a preferred construction of magnets 17 and belt mounting in the top conveyor. Each magnet 17 includes a yoke 24 and a core 25 both of magnetic material. The core preferably is of short length and relatively wide rectangular cross section and carries a winding 26. The magnets can be supported in any suitable fashion, such as by side plates 27 which engage the yokes and also can serve as mountings for sheaves 15 and 16. If desired, several conveyors similarly constructed can be supported side by side for handling wide sheets. the lapping device operates most successfully with short length, high intensity poles of substantially rectangular cross section. Consequently the lower end of core 25 carries a pole extension 28 of such configuration and the ends of the arms of yoke 24 taper down at 29 to about the same longitudinal length as said pole extension. The arms of yoke 24 and the pole extension 28 carry a transverse axle 30 of non-magnetic material. Rollers 31, also of non-magnetic material, are mounted on said axle, preferably on antifriction bearings 32. The conveyor belts 14 ride on said rollers. The conveyor can be equipped with any suitable belt tensioning means, not shown.

Magnets 18 in the top conveyor are similarly constructed, except as already stated, they are of lower strength, preferably progressively diminishing in strength away from the break 19. Magnets 23 in the bottom conveyor likewise are similarly constructed, except they are inverted and their polarity is different. The pole extensions 28 of all the magnets 17 furnish poles of one polarity, which can be either north or south. The ends of yokes 24 of all the magnets 17 furnish poles of the opposite polarity. The pole extensions of all the magnets 23 furnish poles of polarity opposite that of the pole extensions of magnet 17. The ends of the yokes of all the magnets 23 furnish poles of polarity opposite that of the end of the yokes of magnet 17. The arrangement of polarity of magnets 18 does not appear to be critical.

From the foregoing description it is seen that the present invention provides a method of lapping sheets in which the sheets automatically are transferred from the top conveyor to the bottom conveyor in lapped relation without need for making and breaking the circuit to the magnets. Consequently there is no time lost as magnets are being energized and de-energized and no reliance on the repeated operation of a mechanical switch. The leading end of each sheet remains in contact with the upper conveyor until the trailing end is firmly in contact with the lower conveyor. Hence it is seen that at least one end of each sheet is fully under control of magnets at all times and sheets never are free to become misaligned. I have found that the continuous energization of the magnets and the constant control exercised on the sheets enables the lapping device to operate at practically any speed and yet lap sheets smoothly without causing cobbles in the line.

While I have shown and described only a single embodiment of the invention, it is apparent that modifications may arise. Therefore, I do not wish to be limited to the disclosure set forth but only by the scope of the appended claims.

I claim:

1. A sheet lapping apparatus comprising superposed spaced apart top and bottom magnetic conveyors, said top conveyor being adapted to carry sheets on its underside and said bottom conveyor to carry sheets on its upper side, said top conveyor extending beyond said bottom conveyor at its entry end and having a portion adjacent this entry end where its underside is substantially parallel to the upper side of said bottom conveyor and another portion where its underside diverges from the upper side of said bottom conveyor.

2. A sheet lapping apparatus comprising superposed spaced apart top and bottom conveyors, said top conveyor including belts and downwardly facing magnetic poles adapted to carry sheets along the underside of the conveyor, said bottom conveyor including belts and upwardly facing magnets adapted to carry sheets along the upper side of the conveyor, said top conveyor extending beyond said bottom conveyor at its entry end and having a portion adjacent this entry end where its underside is substantially parallel to the upper side of said bottom conveyor and another portion commencing intermediate its length where its underside diverges from the upper side of said bottom conveyor.

3. A sheet lapping apparatus comprising superposed spaced apart top and bottom magnetic conveyors, said top conveyor including magnets having downwardly facing poles and movable belts surrounding its magnets, said bottom conveyor including magnets having upwardly facing poles of polarity opposite that of the magnets in said top conveyor and movable belts surrounding its magnets, said top conveyor extending beyond said bottom conveyor at its entry end and having a portion of its underside substantially parallel to the upper side of said bottom conveyor and a portion of its underside diverging from said bottom conveyor, the magnets in the parallel portion of said top conveyor being of greater strength than those in the diverging portion.

4. A sheet lapping apparatus comprising superposed spaced apart top and bottom magnetic conveyors, said top conveyor including magnets having downwardly facing poles, sheaves at each end, at least one of which is power driven, and endless belts surrounding said sheaves and magnets, said bottom conveyor including magnets having upwardly facing poles of polarity opposite that of the magnets in said top conveyor, sheaves at each end, at least one of which is power driven, and endless belts surrounding its sheaves and magnets, the belts of said top conveyor being adapted to be driven faster than those of said bottom conveyor, said top conveyor extending beyond said bottom conveyor at its entry end, and having a portion of its underside adjacent the entry end substantially parallel to the upper side of said bottom conveyor and a portion of its underside commencing intermediate its length diverging from said bottom conveyor, the magnets in the parallel portion of said top conveyor being of greater strength than those in the diverging portion.

5. A method of lapping sheets comprising introducing the sheets to the underside of a magnetic conveyor having downwardly facing magnetic poles, changing the plane of travel of the leading ends of the sheets in an upward direction and thereby breaking the trailing ends away from the conveyor, attracting the trailing ends as they break away to a second magnetic conveyor spaced beneath the first conveyor and traveling more slowly, and then breaking the leading ends away from the first conveyor and attracting them to the second conveyor.

6. A method of lapping sheets comprising introducing the sheets to the underside of a continuously energized magnetic conveyor having downwardly facing magnetic poles, changing the plane of travel of the leading ends of the sheets in an upward direction and thereby breaking the trailing ends away from the conveyor, attracting the trailing ends as they break away to a second continuously energized magnetic conveyor spaced beneath said first conveyor and having upwardly facing magnetic poles and traveling more slowly, and then breaking the leading ends away from the first conveyor and attracting them to the second conveyor.

DARIO BUCCICONE.

No references cited.